United States Patent [19]

Waldvogel

[11] Patent Number: 4,835,901

[45] Date of Patent: Jun. 6, 1989

[54] FISHING HOOK-LEADER HOLDER

[76] Inventor: Jerry L. Waldvogel, 306 Second Ave., Keewatin, Minn. 55753

[21] Appl. No.: 270,476

[22] Filed: Nov. 9, 1988

Related U.S. Application Data

[63] Continuation of Ser. No. 507,742, Jun. 27, 1983, abandoned.

[51] Int. Cl.⁴ ............................................. A01K 97/06
[52] U.S. Cl. ..................................... 43/57.1; 43/57.2; 206/315.11
[58] Field of Search .............................. 43/57.1, 57.2; 206/315.11, 566

[56] References Cited

U.S. PATENT DOCUMENTS 3,464,143 9/1969 Scott .

Primary Examiner—Kurt Rowan
Attorney, Agent, or Firm—James E. Olds

[57] ABSTRACT

A hook-leader holder, used for fishing, including a tubular housing (12), metal eyelets (28) secured to the housing (12), Velcro-like surface (24) secured to the housing (12) and compatible Velcro-like tabs (26) used to selectively hold the looped end of the leader line (15) to the surface (24). End caps (22) close each end of the housing (12) to define a storage area within the housing (12).

7 Claims, 1 Drawing Sheet

FISHING HOOK-LEADER HOLDER

This application is a continuation of application Ser. No. 507,742, filed June 27, 1983, now abandoned.

BACKGROUND OF THE INVENTION

The present invention relates broadly to an apparatus for safely holding hook-leader combinations used for fishing. There have been various prior art fish hook and leader holders such as those shown in U.S. Pat. No. 2,596,896 (Goad); 2,744,353 (Adams); 2,670,564 (Keener); and 2,789,389 (Moen).

The patent to Moen shows one type of configuration wherein the barbed end of the hook has to be imbedded into a soft material for holding the hook in place and the leader line is tightly wound about the drum to provide the needed line tension to maintain the point imbedded in the soft pliable material. Similarly, Goad and Adams imbed the point of the hook into a soft material like balsa wood or sponge rubber. It would be better not to imbed the point of the fish hook into anything as such imbedding tends to dull the point; nor is it advisable to rely on a tight wrapping of the leader line to keep the hook in place because such tension in the leader line causes the line to coil when it is unwound. Keener users a different concept whereby the hook is passed through an opening and the leader line is then wrapped around the circumference of the holder.

None of the known prior art utilize the concept whereby the cylindrical configuration of the holder in combination with an eyelet type opening causes the sharpened or barbed end of the hook to be turned towards and into contact with a curved support surface when the eyelet end of the hook is pulled toward the curved surface by winding the leader line about the surface, and thus minimize the chance of the point of the hook from getting caught in the hand of the user, clothes of the user, other tackle, etc. during handling and normal storage conditions.

SUMMARY OF THE INVENTION

The present invention is a fish hook-leader holder including a substantially cylindrical housing of a diameter between approximately ¾ inches to approximately 2½ inches, and eyelet-type projections extending from the curved surface of the housing whereby when a fish hook between the size of a No. 14 hook and a No. 4/0 hook is inserted through one of the eyelet-type openings and the leader line is partially wrapped about the cylindrical housing, the hook rotates in the eyelet of the hook and the barbed end of the hook is forced downwardly toward and into contact with the cylindrical surface of the housing. Means is then used to secure the wrapped leader line to the housing.

DETAILED DESCRIPTION OF THE PREFERRED EMBODIMENT

Figure 1:
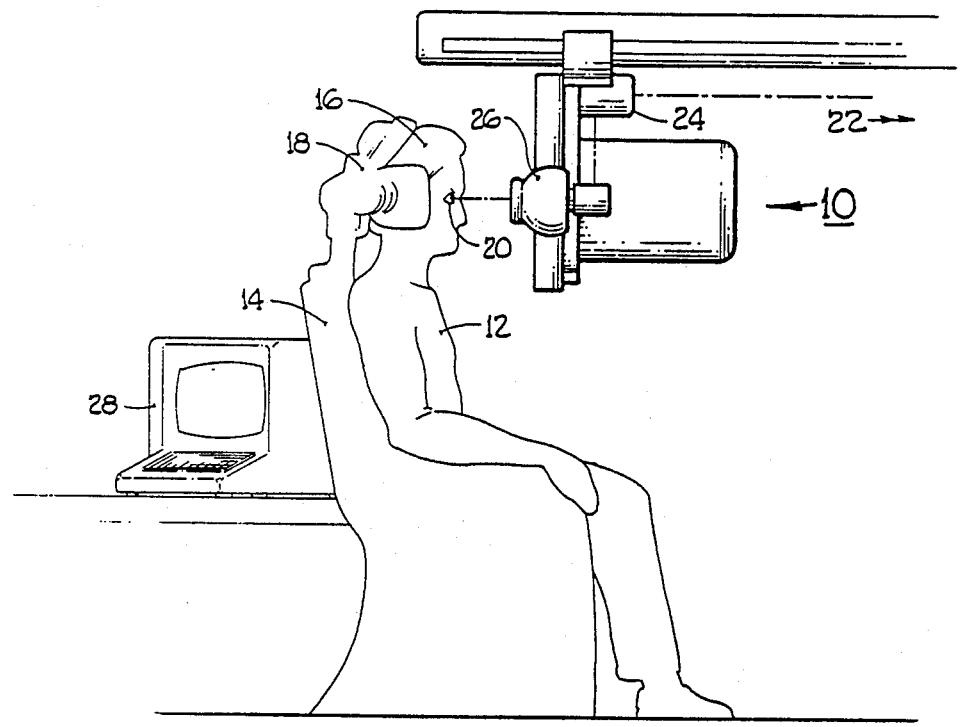
FIG. 1 is an isometric view of the hook-leader holder showing a hollow cylindrical housing, end caps and hook-leader combinations secured to the holder.
Figure 2:
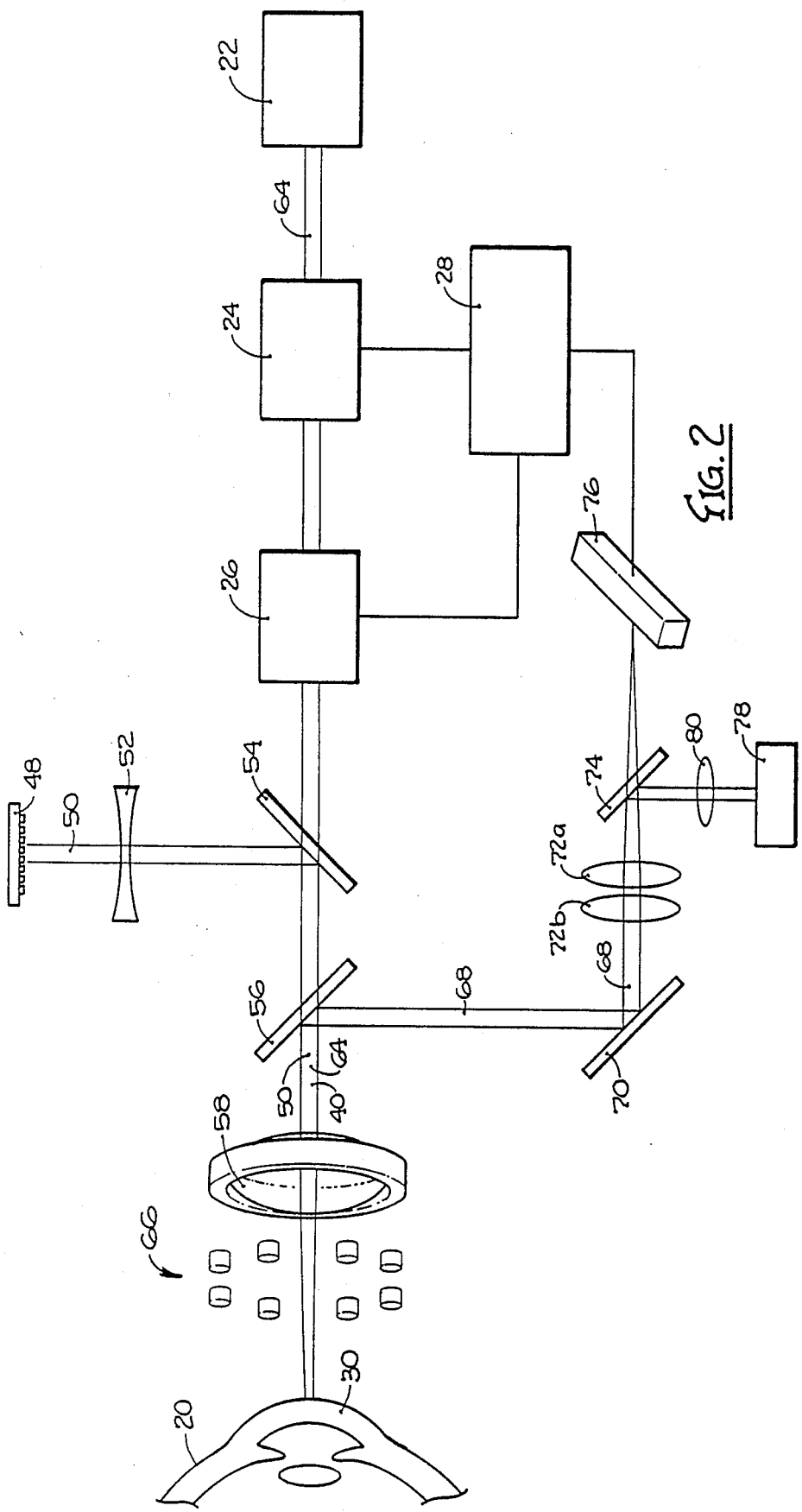
FIGS. 2 through 5 show a sequence of steps of securing a hook-leader to the holder from inserting a hook through an eyelet (FIG. 2), pulling the shank of the hook against the cylindrical housing (FIG. 3), whereby by continued movement of the leader line about the holder the hook rotates (FIG. 4) to a position as shown in FIG. 5 and the pointed end of the hook is forced against the housing.

Referring to the drawing in detail, there is shown in FIG. 1 a hook-leader holder 10 including a tubular, generally cylindrical plastic tube 12 or housing. The tube 12 can selectively vary in size between an exterior diameter of ¾ inches to 2½ inches depending on the shank length and size of the hook 14 to be used with the holder 10. A hook with a longer shank would be used normally on a holder with a larger diameter so that the eyelet end 16 of the hook would not extend far beyond the tube and cause snagging of the eyelet end of the hook—see FIG. 5 where the eyelet end 16 of the hook would not normally present a snagging problem. In the disclosed preferred embodiment, the tube 12 is a CPVC hot and cold water pipe. The end caps 22 slide over each end of the tube 12, are held in place by a friction fit, and provide a chamber within the tube 12 for storage of fishing supplies such as sinkers, etc. The generally cylindrical tube 12, cooperates with the eyelet 28 to rotate the hook 14 as explained throughout the specification, and also provides a relatively gently curving surface that minimizes kinking of the leader line as it is wound about the cylindrical surface.

Encircling and secured to the outer cylindrical surface of the tube 12 is a Velcro-like surface 24 that provides the base or securing material for the compatible Velcro-like tabs 26. As is generally known with Velcro-like material, one surface is composed of loops while the compatible surface is composed of hooks and the interlocking of the loops and hooks secure the surfaces together. As shown in FIG. 1, after the hook 14 is inserted through the eyelets 28, the leader line 15 is wrapped about the tube 12 and surface 24, and then the looped end of the leader line 15 is held in place by overlapping the looped end of the line with a tab 26.

Figure 3:
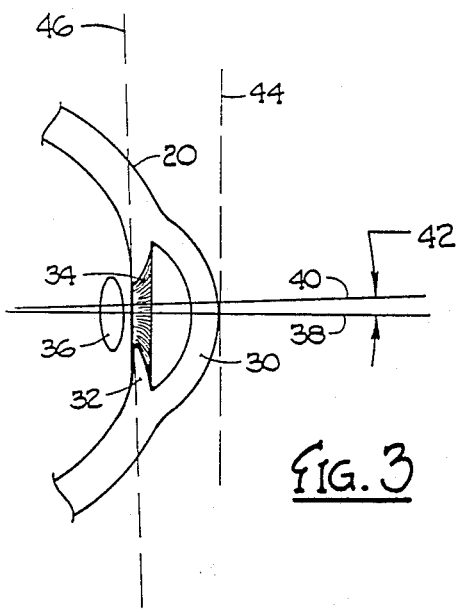
Figure 4:
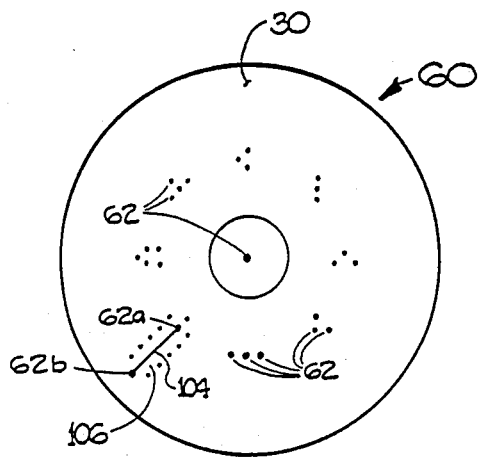

As shown in FIGS. 1-5, metal eyelets 28 have been secured to the wall of the tube 12 to provide a circular eyelet opening (with an axis parallel to the axis of the tube 12); as shown, each eyelet 28 is formed by rounded wire (circular in cross section) bent to form a circular eyelet opening 17 and threaded at the opposite end thereof for threaded engagement with the wall of the tube 12. The eyelets 28 provide the anchor point for the bail portion of the hook 14 and cooperate with the cylindrical surface of the holder 10 to cause the barbed end 18 of the hook 14 to rotate toward the surface, as illustrated by arrow 30, while the bail portion of the hook 14 moves away from the surface 24, as illustrated by arrow 32, (see FIG. 4) when the leader line 15 is wrapped about the holder 10 (see FIGS. 3 and 5) and the shank of the hook pivots about the pivot area as represented by the arrow 34 as shown in FIG. 3. The eyelet opening 17 has to be sufficiently large enough to allow the barbed end of a 4/0 hook to pass therethrough.

Figure 5:
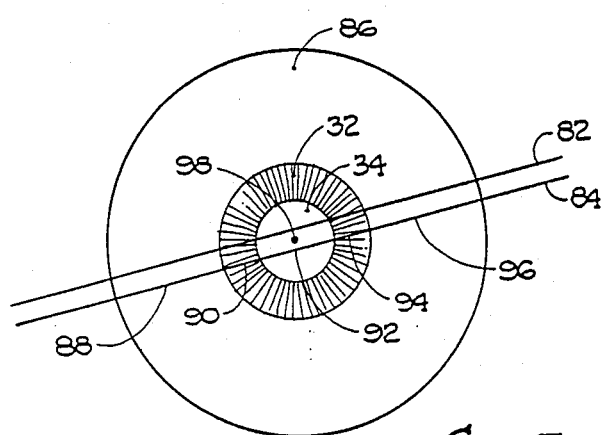
Figure 6:
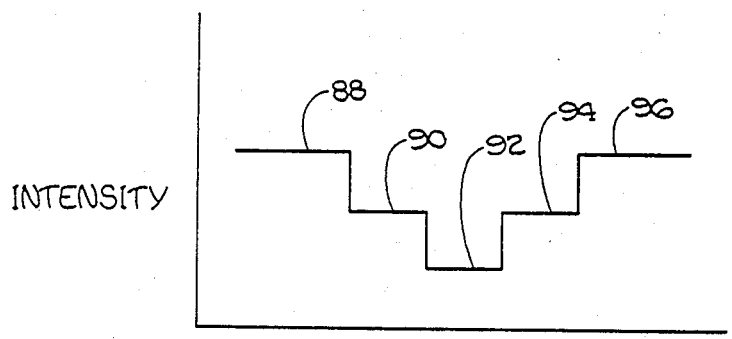
Figure 7:
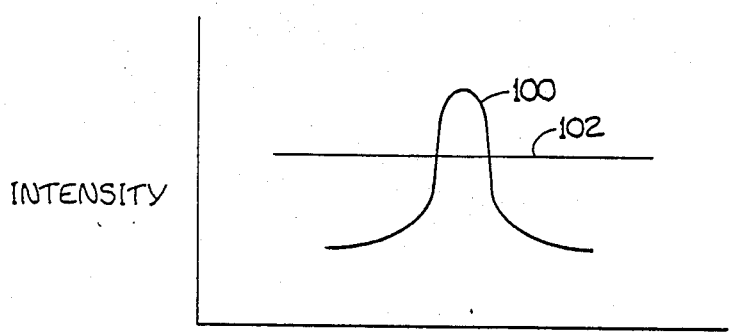
Figure 8:
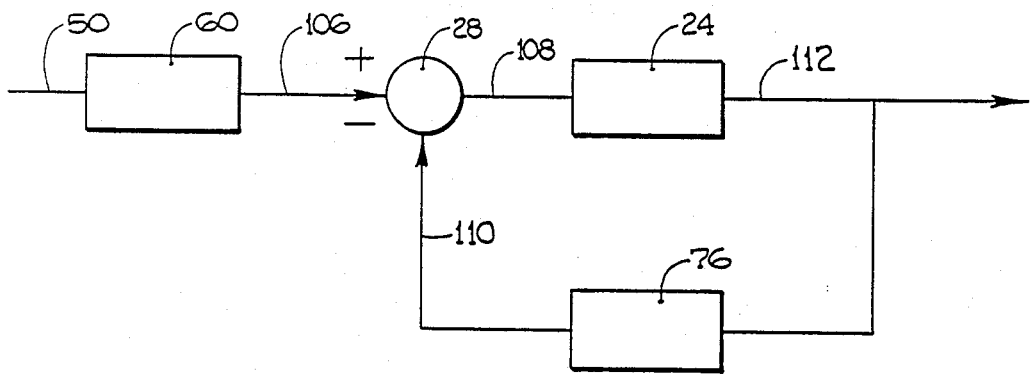
Figure 1:
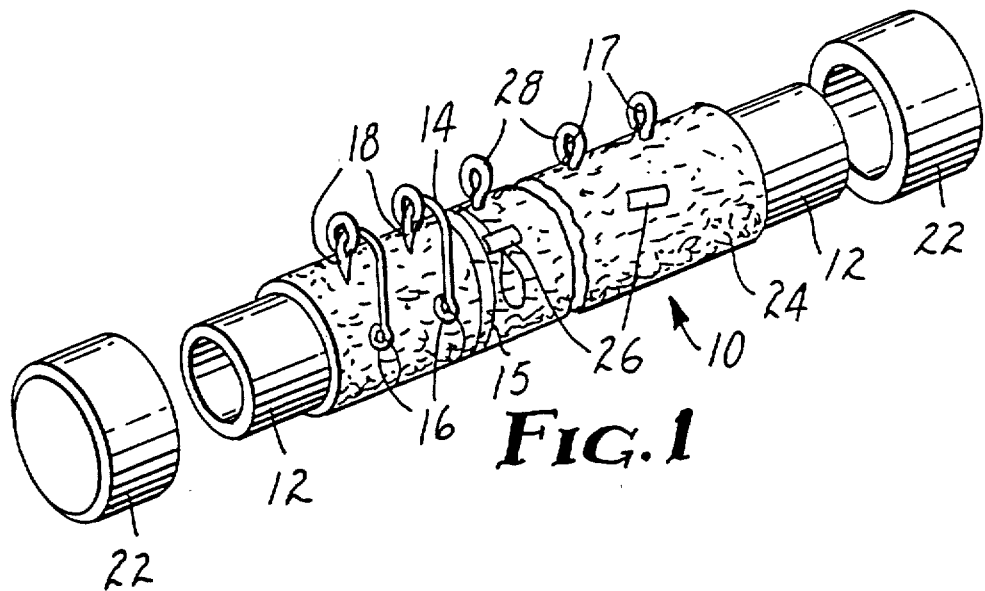
Figure 2:
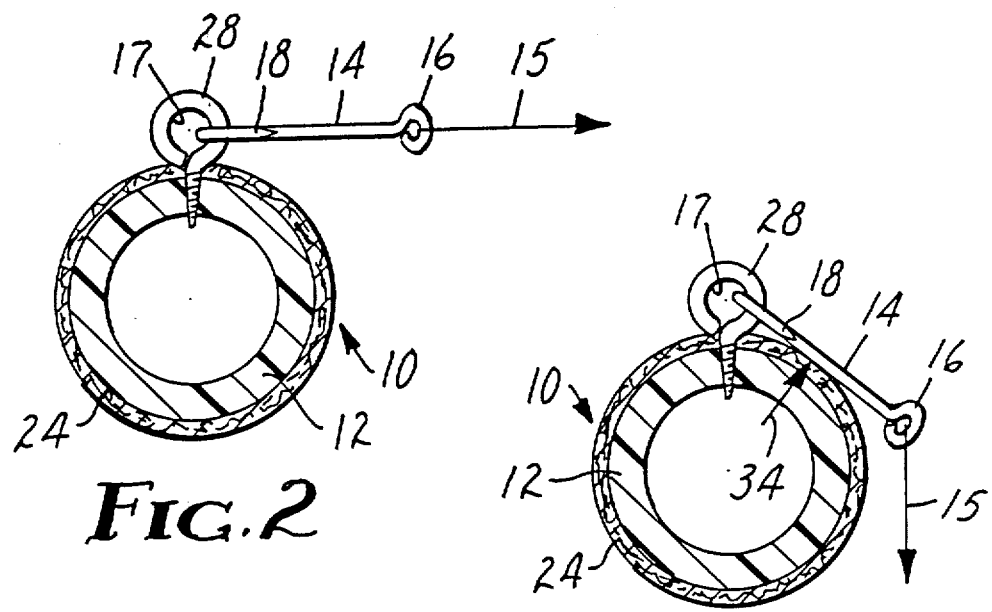
Figure 3:
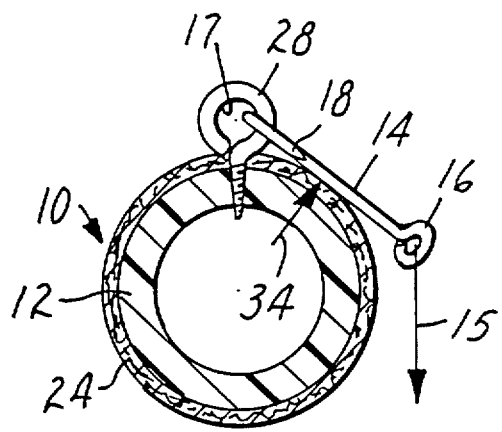
Figure 4:
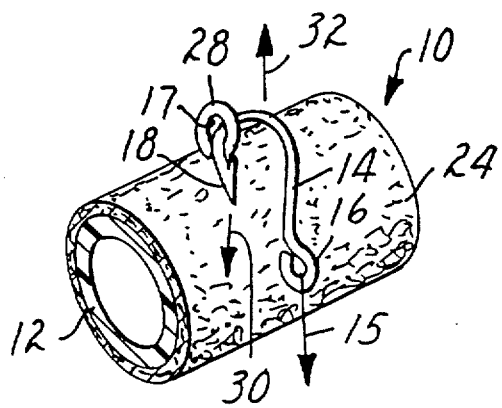
Figure 5:
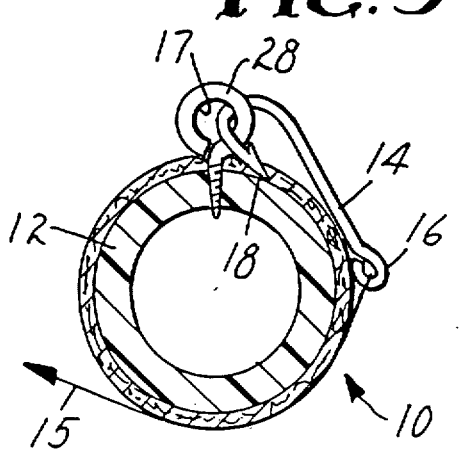

As previously explained, in use, the fisherman would insert the barbed end 18 of the hook 14 through one of the eyelets 28 (see FIG. 2) and begin to wrap the leader line 15 about the Velcro-like surface 24 which is secured to outer cylindrical surface of the tube 12 (see FIG. 3). The hook 14 pivots in the general area of arrow 34 and rotates whereby the bail portion of the hook 14 moves in direction shown in arrow 32 and the barbed end 18 of the hook 14, or the point of the hook, moves as shown in the direction shown in arrow 30 of FIG. 4 into contact with the surface 24 against the tube 12. The user, then to further secure the fish hook to the holder, continues to wrap the leader line about the housing as shown in FIG. 5 (and FIG. 1) until the looped end of the leader line 15 is then secured in place with the Velcro-like compatible tab 26 as shown in FIG. 1.

It should be readily apparent that the structure set forth in the preferred embodiment could be changed and yet the concept of causing the barbed end of the hook to rotate toward the tube (as opposed to being pointed away from the surface wherein a person could be injured by the sharpened point) would remain essentially the same. For example, the holder would not need to be hollow (it could be solid), the holder need not be exactly cylindrical (it could be eliptical or many sided for certain size hooks and shank lengths), the hook would still safely rotate into the surface as if the surface were cylindrical; and the eyelets need not be separate metal pieces but could be circular openings molded as part of the tube 12. Further, at least two hooks could be secured to each eyelet, each one having leaderline wound in the same or opposite directions about the holder, and each inserted through first one side of the opening or the opposite side of the opening and still the concept disclosed herein will cause the pointed barbed end of the hook to rotate safely toward and into contact with the surface 24. While different diameter holders can be used, such as less than ¾ inches and greater than 2½ inches, the claimed range between ¾ inches and 2½ inches performs adequately for fish hooks ranging in size between a number 14 and a number 4/0 (as they are commonly classified).

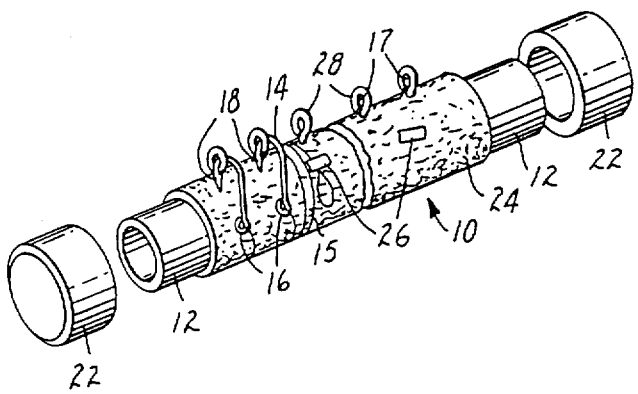

What I claim is new and desire to protect by Letters Patent is:

1. A fish hook and leader holder, comprising:
    a. a substantially cylindrical housing;
    b. projections extending from the outer cylindrical surface of said housing, each of said projections having an enclosed opening being large enough to permit the barbed end of a 4/0 fish hook to pass through said opening;
    c. said cylindrical housing ranging in diameter between approximately ¾ inches to approximately 2½ inches to effectively hold fish hooks ranging in size between a number 14 fish hook to a number 4/0 fish hook, whereby after the barbed end of a fish hook is passed through one of said openings and the leader tied to the eyelet end of the fish hook is pulled and wrapped circumferentially about said housing, the barbed end of the fish hook is forced toward and into contact with the surface of said housing to minimize accidental snagging of the barbed end of the fish hook into other tackle, the hand or clothes of the user; and
    d. means for securing the wrapped leader to said housing.

2. A fish hook and leader holder, comprising:
    a. a substantially cylindrical housing, having a longitudinal housing axis;
    b. a projection radially extending from the surface of said housing;
    c. an enclosed hole in said projection, said hole having a longitudinal hole axis substantially parallel to said housing axis, said hole providing an opening large enough to receive the barbed end of a fish hook;
    d. said cylindrical housing ranging in diameter between approximately ¾ inch to approximately 2½ inches whereby the barbed end of a fish hook is passed through said hole and the leader line tied to the fish hook is wrapped circumferentially about said cylindrical housing, the barbed end of the fish hook is forced toward the surface of said housing to minimize accidental snagging of the pointed barbed end of the fish hook with other tackle, the hand, or clothes of the user; and
    e. means for securing the wrapped leader to said housing.

3. The fish hook and leader holder of claim 2, wherein the surface of said projection defining said hole is beveled on both sides of said projection.

4. The fish hook and leader hole of claim 3 wherein the beveled surfaces defining said hole are shaped to define a semicircular surface extending from the beginning of the hole to the end of the hole along the direction of the hole axis.

5. The fish hook and leader holder of claim 2 wherein said projection has a generally doughnut-like shape to define said hole.

6. A fish hook and leader holder, comprising:
    a. an elongated substantially cylindrical housing having a longitudinal axis;
    b. radially extending projections, extending from the outer cylindrical surface of said housing, each of said projections being in approximate longitudinal alignment and each of said projections having an enclosed opening being large enough to permit the barbed end of a 4/0 fish hook to pass through said opening, said openings being in approximate longitudinal alignment;
    c. said cylindrical housing ranging in diameter between approximately ¾ inches to approximately 2 inches to effectively hold fish hooks ranging in size between a number 8 fish hook to a number 4/0 fish hook, whereby after the barbed end of a fish hook is passed through one of said openings and the leader tied to the eyelet end of the fish hook is pulled and wrapped circumferentially about said housing, the housing contacts the shank portion of the hook, between the hook eyelet and the bail portion of the hook, causing the hook to pivot wherein the barbed end of the fish hook is forced toward and into contact with the surface of said housing to minimize accidental snagging of the barbed end of the fish hook into other tackle, the hand or clothes of the user; and
    d. means for securing the wrapped leader to said housing.

7. The fish hook and leader holder of claim 6, wherein each of said projections, defining each enclosed opening, is formed of a closed wire eyelet.

* * * * *

UNITED STATES PATENT AND TRADEMARK OFFICE
CERTIFICATE OF CORRECTION

PATENT NO. : 4,835,901

DATED : Jun. 6, 1989

INVENTOR(S) : Jerry L. Waldvogel

It is certified that error appears in the above-identified patent and that said Letters Patent is hereby corrected as shown below:

The title page showing the illustrative figure should be deleted to appear as per attached page.

The sheets of drawing should be deleted to be replaced with the sheet of drawing as shown on the attached sheet.

Signed and Sealed this

Twentieth Day of March, 1990

Attest:

JEFFREY M. SAMUELS

Attesting Officer

Acting Commissioner of Patents and Trademarks

United States Patent [19]

Waldvogel

[11] Patent Number: 4,835,901
[45] Date of Patent: Jun. 6, 1989

[54] FISHING HOOK-LEADER HOLDER

[76] Inventor: Jerry L. Waldvogel, 306 Second Ave., Keewatin, Minn. 55753

[21] Appl. No.: 270,476

[22] Filed: Nov. 9, 1988

Related U.S. Application Data

[63] Continuation of Ser. No. 507,742, Jun. 27, 1983, abandoned.

[51] Int. Cl.⁴ .............................................. A01K 97/06
[52] U.S. Cl. ...................................... 43/57.1; 43/57.2; 206/315.11
[58] Field of Search ............................... 43/57.1, 57.2; 206/315.11, 566

[56] References Cited

U.S. PATENT DOCUMENTS 3,464,143  9/1969  Scott

Primary Examiner—Kurt Rowan
Attorney, Agent, or Firm—James E. Olds

[57] ABSTRACT

A hook-leader holder, used for fishing, including a tubular housing (12), metal eyelets (28) secured to the housing (12), Velcro-like surface (24) secured to the housing (12) and compatible Velcro-like tabs (26) used to selectively hold the looped end of the leader line (15) to the surface (24). End caps (22) close each end of the housing (12) to define a storage area within the housing (12).

7 Claims, 1 Drawing Sheet